Jan. 25, 1955 R. L. SMIRL 2,700,312
TRANSMISSION
Filed March 31, 1949 2 Sheets-Sheet 2
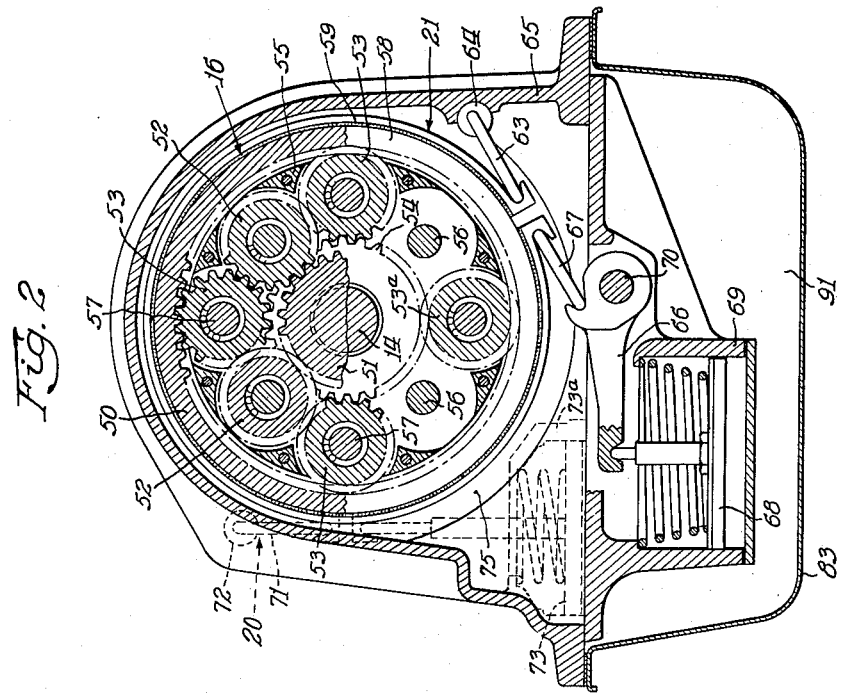
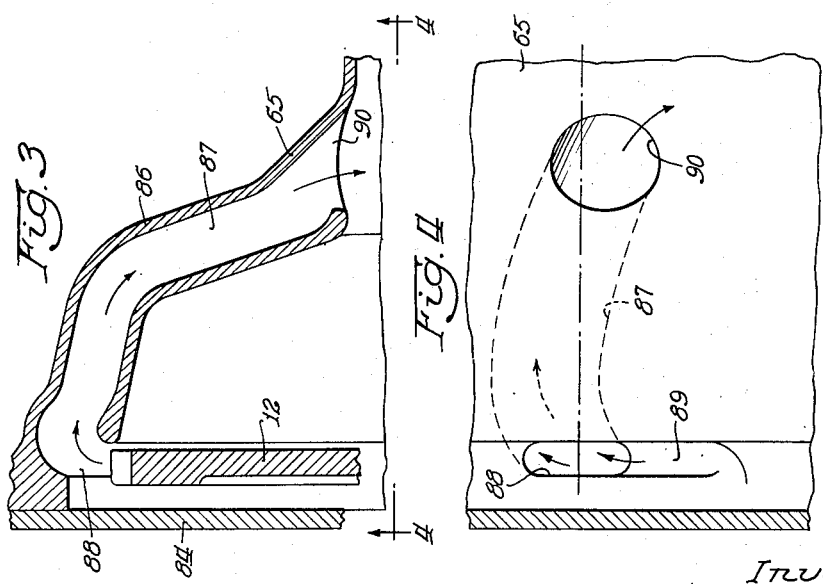
Inventor:
Richard L. Smirl
By: Edward C. Gritzbaugh
Att.

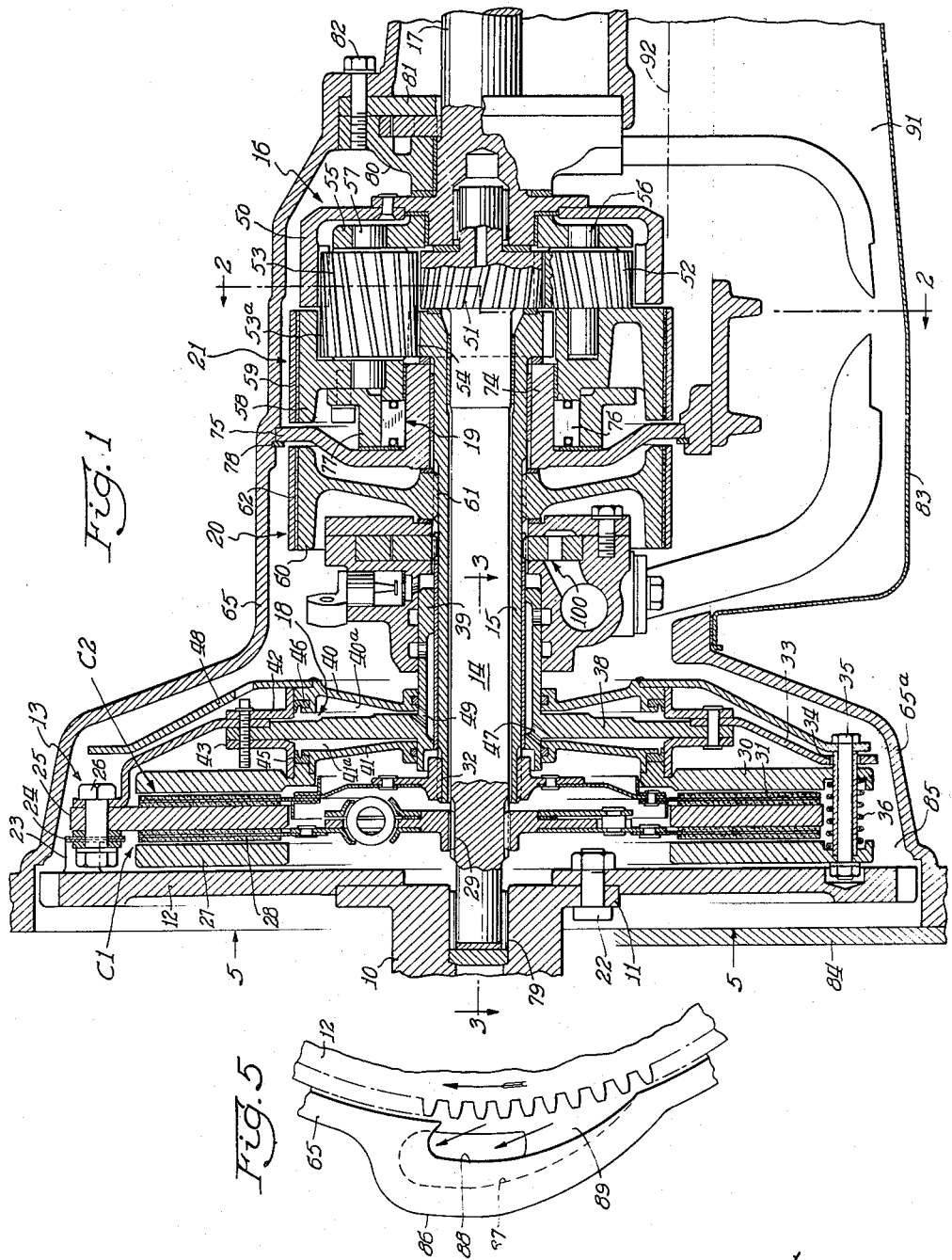

United States Patent Office 2,700,312
Patented Jan. 25, 1955

2,700,312

TRANSMISSION

Richard L. Smirl, La Grange, Ill., assignor to Borg-Warner Corporation, Chicago, Ill., a corporation of Illinois Application March 31, 1949, Serial No. 84,581

3 Claims. (Cl. 74—763)

This invention relates to transmissions and more particularly to change-speed transmissions suitable for use in automotive vehicles.

An object of the invention is to provide an improved transmission, including multiple clutch and change-speed gear units having suitable controls for providing a plurality of forward speed ratios.

Another object of the invention is to provide an improved transmission, including a plurality of friction clutches and a change-speed planetary gear unit, the friction clutches being selectively operable to directly connect the change-speed unit to power means, such as an engine, to transmit the torque thereof to the change-speed unit for multiplication and transfer to the load.

Another object of the invention is to provide an improved transmission, including a change-speed gear unit, and a plurality of clutches selectively operable to directly connect power means, such as an automotive engine, to the different members of the gear unit whereby to provide a two-path power flow arrangement between the engine and load.

A further object of the invention is to provide an improved transmission for automotive vehicles, in which a plurality of friction clutches may be selectively or successively engaged to transmit power from the engine directly to change-speed planetary gearing, and a plurality of alternately operable coupling devices to control the change-speed conditions of the gearing to provide a suitable number of forward variable speed ratio drives and reverse drive, a feature of the invention residing in the employment of one of the coupling devices to provide a brake during engagement of one of the clutches to decelerate the speed of the vehicle when descending on an inclined slope.

Another object of the invention is to provide an improved transmission for automotive vehicles and embodying a planetary gear unit connected to the driven wheels of the vehicle, a double friction clutch assembly alternately or successively engageable to connect one or more members of the gear unit directly to the engine, and a plurality of coupling devices affording reaction means for members of the gearing unit, during operation of said clutches, to provide three forward variable speed ratio drives and reverse drive, one of the clutches being engaged to complete the forward first and second speed ratio drives and the other clutch being engaged to complete reverse drive, operation of both of the clutches providing the third speed ratio or direct drive.

The invention also contemplates, in a transmission as described, the employment of a novel arrangement of a coupling device, in the form of a brake, and planetary gearing wherein a brake drum is fixed to a reaction member of the gearing, and a brake band, connected to a stationary portion of the transmission, is engageable with the brake drum when it is stationary to complete a power train between the drive and driven shafts of the transmission. This feature of the transmission is advantageous in eliminating the bearing problem occurring in transmissions wherein the load, placed on a brake band during engagement with a brake drum rotating with a reaction member, is transmitted by the planetary gearing to the bearing of a shaft or the like supporting the reaction member with consequent rapid wear of the bearing.

Another feature of my improved transmission is the provision of controls for the planetary gearing including the novel arrangement of a coupling device, in the form of an overrunning or freewheeling assembly, interposed between a stationary support and a rotatable reaction member of the planetary gearing and providing automatically operable means permitting shifting of the gearing between different speed ratios with an extremely smooth transition of shockless character and without the necessity of accurately timing overlapping operation of the controls during speed changes.

Another object of the invention is to provide an improved oil-cooling arrangement for the transmission.

Another object of the invention is the provision of a novel housing for the clutch structure and gearing of my improved transmission, wherein the housing is formed as a unitary casting.

The invention consists of the novel constructions, arrangements, and devices to be hereinafter described and claimed for carrying out the above-stated objects and such other objects as will appear from the following description of the embodiment illustrated in the accompanying drawings, wherein:

Fig. 1 is a longitudinal sectional view of a transmission embodying the principles of the invention;

Fig. 2 is a sectional view taken on line 2—2 of Fig. 1; and

Figs. 3, 4 and 5 are views of portions of the transmission housing and flywheel to illustrate the improved oil-cooling arrangement of the transmission.

Like characters of reference designate like parts in the several views.

Referring now to Fig. 1, the transmission illustrated may be seen to comprise a drive shaft 10, which may be the rear extremity of an engine crankshaft, and the shaft 10 is provided with a radial flange 11, to which is bolted the flywheel 12. The flywheel 12 is adapted to support the driving members or plates of a double clutch assembly, indicated generally at 13, engageable with driven friction plates of the assembly, respectively keyed to a shaft 14 and a quill shaft 15, which are drivingly connected to members of a planetary gear set, generally indicated at 16. The gear set 16 is connected to a driven shaft 17 transmitting drive to the rear wheels of an automobile. Engagement of the driving plates and the driven plates of the multiple clutch assembly 13 is effected by means of a fluid pressure actuated mechanism indicated generally at 18. The clutch operating mechanism 18 is effective to alternately or successively effect engagement of the clutches C1 and C2, forming the multiple clutch assembly 13, to transmit torque from the driving shaft 10 to either or both of the shafts 14 and 15 connected to the planetary gear set 16. Suitable controls are provided for the planetary gear set 16 to effect operation thereof to provide different forward speed ratio drives, and reverse drive. These controls comprise a freewheeling or overrunning brake device 19 to provide a low speed ratio, a friction type brake 20 for the second or intermediate speed ratio, and another friction type brake 21 for establishing either a low speed hill-braking ratio or reverse drive of the driven shaft 17; the controls 19, 20 and 21 controlling various reaction elements of the planetary gear set 16 in a manner hereinafter described.

Referring more particularly to Figs. 1 and 2 of the drawings for a more detailed description of the transmission, the flywheel 12 is bolted to the flange 11 of the drive shaft 10 by a plurality of bolts, one of which is shown at 22. The flywheel is provided with a plurality of circumferentially spaced lugs 23 at one side thereof, and each lug has secured thereto a plurality of flexible steel straps 24 connected to the clutch driving plate 25 of the clutch assembly 13 by means of bolt and nut assemblies 26. The clutch driving plate 25 is common to and may be considered as one of the driving members of either the clutch C1 or the clutch C2. The clutch C1 further comprises a pressure plate 27 and a driven plate 28 disposed between the plates 27 and 25 and having its hub splined as at 29 to the shaft 14. The clutch C2 also comprises a pressure plate 30, and a driven plate 31 disposed between the plates 30 and 25 and having its hub splined as at 32 to the quill shaft 15.

The pressure plates 27 and 30 are connected to the flywheel 12 for rotation therewith by means of a dished sheet metal stamping or plate 33 provided with a plurality of circumferentially spaced openings at its outer periphery for receiving therein the bolts of the bolt and nut assemblies 26 to drivingly connect the flywheel 12 to the plate 33, and the plate 33 is also provided with other circumferentially spaced openings, indicated at 34, for receiving the bolts of the bolt and nut assemblies 35, the bolts extending through openings in the pressure plates 27 and 30 to provide a driving connection between the plate 33 and the pressure plates. Disposed between the pressure plates 27 and 30 are a plurality of springs, one of which is indicated at 36, surrounding the bolt and nut assemblies 35 and operative to normally move the pressure plates out of engagement with the driven clutch plates 28 and 31. The fluid operated actuating mechanism 18 is utilized to effect axial movement of the pressure plates 27 and 30 toward the intermediate plate 25 for engagement of these plates with the driven clutch plates 28 and 31.

The actuating mechanism 18 comprises an annular pressure fluid-distributing member or plate 38 having, at its radially inner extremity, an axially extending hub 39 rotatably mounted on the quill shaft 15. Disposed at opposite sides of the annular member 38 are pistons 40 and 41, each comprising an annular dished plate having a radially inner extremity slidably engaging the hub 39 of the plate 38. The radially outer extremities of the pistons 40 and 41 are disposed adjacent rings 42 and 43, respectively, of angular cross-section which are secured to the plate 38 and drive plate 33 by rivets as shown. Suitable seals 45 and 46 prevent the escape of fluid from the two pressure fluid chambers 40a and 41a defined by the distributor plate 38 and pistons 40 and 41, respectively.

The piston 41 engages the radially inner periphery of the pressure plate 30 and, upon the entrance of pressure fluid through the passage 47 in the distributor plate 38 and into the chamber 40a, the piston 41 will actuate the plate 30 into engagement with the driven clutch plate 31 to establish a driving connection between the driving shaft 10 and the quill shaft 15.

Associated with the piston 40 is an annular actuating plate 48, and the plate 48 is provided with a series of openings in its radially outer margin receiving the bolts of the bolt and nut assemblies 35 so that, upon the entrance of fluid under pressure through the opening 49 in the distributor plate 38, the piston 40 will move to the right, as viewed in Fig. 1, to move the nut and bolt assemblies 35 and thereby actuate the pressure plate 27 into engagement with the driven clutch plate 28 to establish a driving connection between the driving shaft 10 and the shaft 14. Suitable controls (not shown) may be provided for controlling the flow of fluid under pressure to either or both of the passages 47 and 49 in the distributor plate 38 to effect alternate or successive engagement of the pressure plates 27 and 30 with the driven clutch plates 28 and 31 to drivingly connect the driving shaft 10 and either or both of the shafts 14 and 15, as desired.

Referring to Figs. 1 and 2, the planetary gear set 16 comprises a ring gear 50 and a sun gear 51, planet gears 52 and 53 meshing with each other, and the planet gear 53 meshing with the ring gear 50 and the planet gear 52 meshing with the sun gear 51, and a sun gear 54. The planet gears 53 are elongated pinions having gear portions 53a meshing with the sun gear 54. The planet gears 52 and 53 are carried by a planet gear carrier 55 respectively by means of shafts 56 and 57 in the carrier. The gears of the planetary gear set 16 have helical teeth, as shown in Fig. 1.

The ring gear 50 is connected to the driven shaft 17 of the transmission; the sun gear 51 is formed as an integral end portion of the shaft 14, and the sun gear 54 is an integral end portion of the quill shaft 15. The planet gear carrier 55 is rotatably disposed with respect to the shafts 14, 15 and 17, and it will be noted that the shaft 17 at its end adjacent the sun gear 51 has a mounting portion for rotatably supporting the carrier 55.

The planet gear carrier 55 can be prevented from rotating by means of the brake 21. The brake 21 comprises a drum 58 formed on the carrier 55 and a friction band 59 surrounding the brake drum 58. The brake 21 is utilized to complete a reverse drive power train as will be described hereinafter in greater detail.

The brake 20 comprises a brake drum 60, splined as at 61 to the quill shaft 15 and thereby rotatable therewith, and a brake band 62 engageable with the brake drum 60 to prevent rotation of the quill shaft 15 and thereby the sun gear 54 to complete a forward drive power train as will be described hereinafter.

Referring to Fig. 2, the brake band 59 of the brake 21 has a reversely-bent end thereof receiving one end of a strut 63, which is anchored as at 64 to a stationary portion of the transmission housing 65, and the band 59 almost completely encircles the drum 58. The band 59 is adapted to engage the drum 58 by actuation of a lever 66 engaging and urging a strut 67 disposed within the adjacent reversely-bent end of the band, toward the opposite end of the band. The lever 66 is connected to a piston 68 in a cylinder 69 of a fluid-pressure device, and the lever is rotated about its pivotal connection 70 to the transmission housing upon the admission of pressure fluid into the cylinder 69 and actuation of the piston 68.

The brake band 62 of the brake 20 is similar to the brake band 59 and has one end connected to a strut 71 anchored as at 72 to the transmission housing. The brake band 62 is applied to the brake drum 60 by means of a fluid pressure device having a piston 73 in a cylinder 73a with the piston rod of the piston 73 acting directly on the engaged end of the brake band 62, upon the admission of pressure fluid into the cylinder 73a, to draw the ends of the brake band 62 together to grip the brake drum 60.

The coupling device 19 is in the form of an overrunning brake, which may be of the sprag type shown, and comprises an inner race 74 surrounding the quill shaft 15, and it may be noted that the inner race 74 is formed as an axially extending portion of an annular support member 75 fixed to the housing 65 and providing a central support for the shafts 15 and 14 and the various elements supported on these shafts. A plurality of sprags 76 are disposed between the inner race 74 and an outer race 77 which is connected to the drum 58 of the brake 21 and thereby rotatable therewith. The one-way coupling device 19 is utilized for completing a forward drive power train as will be described hereinafter in greater detail.

Describing now the operation of the transmission, and including its controls, for obtaining three forward speed ratio drives and reverse drive, the transmission is shown in its neutral condition in Figs. 1 and 2 of the drawings, the clutches C1 and C2 and the brake devices 20 and 21 being disengaged. It may be noted that the only way torque can be transmitted from the drive shaft 10 to the shafts 14 and 15 and thereby to the planetary gear set 16 and the driven shaft 17 is through the engagement of one or the other of the clutches C1 and C2 and that the clutches provide parallel torque paths between the driving shaft 10 and the planetary gear set 16.

Low speed forward drive through the transmission is obtained by directing pressure fluid to the piston 40 for actuation thereof to urge the pressure plate 27 into engagement with the clutch driven plate 28. The clutch C1 thereby functions to transmit drive from the driving shaft 10 to the shaft 14, and sun gear 51 will rotate in a clockwise direction as viewed from the left of Fig. 1. Rotation of the sun gear 51 in a clockwise direction will cause the planet gears 53 and 52 and their carrier 55 to tend to rotate in a counterclockwise direction. However, the sprags 76 of the one-way or overrunning clutch or coupling device 19 are adapted to grippingly engage the inner and outer races 74 and 77 upon any attempted rotation of the outer race 77 in a counterclockwise direction by the carrier 55 connected thereto. Accordingly, counterclockwise rotation of the planet gears 52 and 53 and carrier 55 is prevented, inasmuch as the outer race 77 of the coupling device is connected to the planet carrier 55 and the inner race 74 is fixed to the stationary transmission housing 65. In this condition of the transmission, drive proceeds from the shaft 14 through the gears 53, 52 and 50 to the driven shaft 17.

The transmission may be shifted from low speed forward drive to second or intermediate speed by merely causing engagement of the brake band 62 with the drum 60 of the brake device 20, the clutch C1 being maintained in engaged position. As will be understood, the planet gear carrier 55 in the low speed drive is the reaction member of the gear set, and engagement of the brake device 20 to hold the sun gear 54 stationary for second speed drive causes the gear 54 to become the reaction member instead of the carrier. Upon the application of the brake device 20, drive will proceed from the drive shaft 10 through the clutch C1 to the shaft 14, the gears 51, 52, 53, and 50 to the driven shaft 17, in the same manner as in low speed drive, but due to the fact that the sun gear 54 is now stationary, the driven shaft 17 is rotated at a faster speed than in low speed drive. It will be apparent that the transmission may be conditioned for second speed drive, instead of low speed drive, when second speed drive is desired to start the automobile, by engaging the clutch C1 and brake 20. It may be noted that, in second speed drive, preventing rotation of the sun gear 54 will cause the planet carrier 55 and the planet gears 52 and 53 carried thereby to rotate in a clockwise direction, whereby the one-way coupling device 19 will be disengaged allowing these planetating elements to rotate in a clockwise direction.

High speed forward or direct drive is obtained by disengaging the brake device 20 and by engaging the clutch C2. Engagement of the clutches C1 and C2 locks the carrier 55 and the sun gear 54 together so that all of the parts of the gear set 16 rotate as a unit. With the gear set locked up, the driven shaft 17 rotates at a one-to-one drive with respect to the driving shaft 10. It will be noted that all of the parts of the planetary gear set 16 will rotate in a clockwise direction so that the one-way coupling device 19 is rendered ineffective to perform its function of preventing counterclockwise rotation of the planetary carrier 55. In the event, it is desired to tow or push the automobile to start the engine, the automobile is brought up to a moderate speed by towing or pushing and the clutches C1 and C2 are then applied to thus advantageously utilize the kinetic energy of the automobile for starting the engine.

When an automobile descends an inclined slope in direct drive, it may be desirable to control the speed of the automobile by the application of one of the control devices of the transmission to provide a brake. The rear wheels of the automobile rotate faster than the crankshaft driven by the engine and directly connected by the engaged clutches C1 and C2 and gear set to the rear wheels, and the engine will thus check the speed of the automobile. However, to provide more effective control of the automobile, the clutch C2 may be released and the brake 21 applied to shift the transmission to low speed drive.

The transmission is conditioned for reverse drive by engaging the clutch C2 to provide a drive between the driving shaft 10 and the quill shaft 15 and thereby the sun gear 54, and by engaging the brake device 21 to prevent rotation of the carrier 55, which then becomes the reaction member of the gear set. In this reverse drive condition of the transmission, rotation of the sun gear 54 in a clockwise direction will cause the ring gear 50 and the driven shaft 17 to be driven in a counterclockwise direction or reversely to the direction of rotation of the drive shaft 10. The drive is from the gear 54 through the planet gears 53 to the ring gear 50.

It will be apparent that an important feature of transmission is the employment of a one-way locking device 19 between the stationary central supporting structure 75 of the transmission housing 65 and the planet carrier assembly, and the operation of the device to control the planet carrier and gears in low speed drive. The one-way locking device 19 provides automatically operable means for controlling the operation of the planet carrier and gears 52 and 53 to provide reaction means in low speed drive and to permit planetating movement thereof in the other forward speed drives. The device is instrumental in permitting the shifting of the transmission between low and intermediate or second speed ratio drives and vice versa, with an extremely smooth transition of shockless character and without the necessity of accurately timing overlapping operation of controls, such as the alternate engagement of brake devices. The controls for the transmission are thus greatly simplified inasmuch as the clutch C1 is engaged for all forward speed drives, it is only necessary to alternately engage and disengage the brake device 20 and the clutch C2 in the transition from one of any of the forward speed ratios to another forward speed ratio.

Another important feature of the transmission is the engagement of the brake band 59 of the brake device 21, when the brake drum 58 is stationary, to initiate the reverse drive power train and also the use of the central support member 75 fixed to the transmission housing to take the eccentric loading of the band 59, when the band 59 is engaged with the brake drum 58. In the reverse drive condition of the transmission, the brake device 21 is engaged, and thereafter the clutch C2 is engaged to effect a drive connection between this clutch and the gear set. Consequently, the various members of the planetary gear set are not rotating prior to engagement of the clutch C2, and, therefore, the brake band 59 is engaged with the drum 58, formed as a portion of the planetary carrier 55, and which is stationary at this time. This feature has considerable merit for a single brake band, when engaged with a rotating drum, will cause forces, produced by the torque reaction on the brake band anchor, to act on the brake drum placing a considerable radial load on the bearings of the gear-supporting shafts with consequent rapid wear of the bearings. However, as in the present case, when a brake band is applied to a brake drum, when the drum is stationary and there is no relative rotation of these members of the brake device, there is no such bearing problem.

A further feature of the transmission is the employment of a brake device 20 constructed as shown in Figs. 1 and 2 and previously described, in combination with the other elements of the transmission. It may be noted from a consideration of Fig. 2 that the fluid pressure device comprises the piston 73 and cylinder 73a and that, upon the admission of pressure fluid into the cylinder 73a, the piston rod of the piston 73 acts directly on the brake band 62 to engage the brake band with the brake drum 60 for establishment of the second forward speed ratio drive of the transmission. The construction of the brake device 20 and its disposition in the transmission, as shown in Fig. 2, is of considerable advantage as the brake device provides a semi-freewheeling action for shifting the transmission from second speed drive into third or direct speed drive, the brake band taking approximately one-half engine torque for one direction of rotation of the brake drum 60 and approximately one-fourth torque for the other direction of rotation of the brake drum.

More particularly, in second speed drive and referring to Fig. 2, the brake drum 60 rotates in a clockwise direction, as viewed in Fig. 2, and inasmuch as one end of the brake band 62 is connected to a stationary part of the transmission housing 65, it will be noted that, when the other end of the band is urged toward the first-mentioned end of the band by the piston 73 of the fluid pressure device, there will be a self-wrapping action of the band around the brake drum 60 to hold the drum 60 stationary.

As previously described, transition from second speed drive to high speed or direct drive is effected by engagement of the clutch C2 and disengagement of the brake 21. Assuming that the clutch C2 is first engaged, the shaft 15 and thereby the brake drum 60 will tend to rotate in a counterclockwise direction, as viewed in Fig. 2, prior to release of the brake band 62 from the brake drum 60. It will be noted that the tendency of the brake drum 60 to rotate in a counterclockwise direction will also cause the brake band 62 to be moved in a similar direction. This will cause the brake band 62 to slacken its grip on the brake drum 60 to provide a semi-free-wheeling action during the shifting of the transmission from second speed ratio drive to high speed ratio or direct drive. It will be understood that the forces on the piston 73 are always in balance regardless of the direction of rotation, and it is the force on the anchor end of the band which changes with the direction of rotation.

It will be thus apparent from the foregoing description that the brake band need take only approximately one-half engine torque during the establishment of second speed ratio drive, as the brake drum 60 has a tendency to rotate in a clockwise direction as viewed in Fig. 2 to effect a self-wrapping action of the band about the drum, and the brake band takes approximately one-fourth engine torque when the brake drum has a tendency to rotate in a counterclockwise direction during the transition between the second speed ratio drive and direct drive. This semi-free-wheeling action in the transition between second speed ratio and direct drive permits changing of these speed ratios without accurately timing the engagement of the clutch C2 with the release of the brake band 62 from the brake drum 60.

Referring to Fig. 2, the gear set 16 comprises four planet pinions 52 and four planet pinions 53. The planet gear arrangement of my transmission is advantageous, as each of the planet pinions 53 can be disposed diametrically with respect to one of the other planet pinions 53, and this is equally true of the planet pinions 52, as shown in Fig. 2. By this arrangement, the teeth on each planet pinion are mated on both sides of the pinion, and since the toothed contact between the pinions is the weakest point in any planetary gear train, such as the dual pinion planetary gear arrangement disclosed, this approximately doubles the capacity of each of the pinions, with the advantage that chipping, breaking, or other structural failures of their teeth are avoided and the life of the gear set is thereby considerably prolonged.

Referring to Fig. 1, the transmission housing 65 may be formed as a unitary casting as shown to provide a casing enclosing the multiple clutch assembly 13, the planetary gear set 16, and other elements of the transmission. It will be apparent that the operating, rotating and control parts of the transmission and including the flywheel 12, as well as the stationary parts of the transmission including the central support member 75, may be assembled as a unitary structure and positioned within the housing 65, as shown in Fig. 1. It may be noted in this respect that the central support member 75 is securely engaged with a shoulder provided on the interior surface of the transmission and is retained in position in the housing by means of an annular spring ring 78 received within a groove in the housing 65, the member 75 being also anchored against rotation. After the transmission is positioned within the housing 65, the bolt assemblies 22 may be utilized to secure the flywheel to the crankshaft 10, which as shown in Fig. 1 has its flywheel end provided with a pocket 79 receiving one end of the shaft 14 to support the shaft 14 and the adjacent elements of the transmission carried thereby. The transmission, including the double clutch assembly 13, the gear set 16, and the various control devices for the clutch assembly and the gear set, is thus principally supported by the shaft 14 which, in turn, is supported at its front end by the crankshaft 10 and adjacent its rearward end by the central support member 75, the driven shaft 17 being supported for rotation by support members 80 and 81 fixed to the housing 65 by bolts 82.

As will be apparent from a consideration of Fig. 1, the component operating parts of the transmission are enclosed by the housing 65. A pan 83 is connected to the bottom of the housing and forms a fluid-sump to supply fluid, such as oil, to a pump 100 for operating the hydraulic devices associated with the brake devices 21 and 20, and to supply fluid to the fluid-actuating mechanism 18 controlling engagement of the clutches C1 and C2.

The housing 65 is bell-shaped and the enlarged portion 65a at the front of the housing encloses the flywheel 12, the clutches C1 and C2, and the mechanism 18. The housing is connected to a plate 84, fixed to the engine, and the portion 65a and the plate 84 define an oil reservoir 85, in which the flywheel 12, clutches C1 and C2, and mechanism 18 are disposed. In a transmission such as described, a cooling arrangement for the oil, in which the gearing and clutch assembly rotate, is desirable. It is also desirable to limit the quantity of oil contained in the reservoir 85 in the portion 65a of the transmission housing 65, for the reason that, if the flywheel, clutches and their actuating mechanism be substantially immersed in the oil, the oil will cause considerable drag on this rotating assembly, with consequent undesirable loss of torque of the engine. In order to provide the two-stated desirable features, the flywheel and clutch-enclosing portion 65a of the housing 65 are provided at one side thereof, as shown in Figs. 3, 4 and 5, with a duct 86 projecting outwardly from the upper part of the wall thereof and extending rearwardly to the gear set-enclosing portion of the housing 65. The duct 86 and its associated wall has a passage 87 adapted to conduct oil from the front end of the housing to and into the gear set-enclosing portion of the housing. The inlet end 88 of the passage 87 is in alignment with the flywheel 12 so that, during rotation of the flywheel, the teeth of the flywheel will be effective to throw a portion of the oil in the reservoir 85 of the clutch-enclosing portion 65a of the housing 65 toward and into the passage 87, the inlet end 88 of the passage having an upwardly inclined surface 89 to facilitate the entrance of the oil into the inlet end 88. The oil will flow downwardly through the passage 87 to the outlet end 90 thereof in the gear set-enclosing portion of the housing and fall into the oil sump 91 provided by the pan 83. As the flywheel 12 rotates in a clockwise direction, the oil, picked up by the teeth of the flywheel, is thrown thereby into the passage 87 and will flow rearwardly of the housing as described. The teeth of the flywheel are thus utilized as a dynamic type of scavenging pump for returning the oil from the reservoir 85 in the clutch-enclosing clutch compartment of the housing to and into the oil sump 91 provided by the pan 83 beneath the planetary gear set 16. This arrangement will thus be effective to cool the oil and to limit the quantity of the oil contained in the clutch-enclosing compartment of the housing. It may be noted that the oil in the clutch-enclosing compartment of the housing is maintained at a constant level inasmuch as oil can only accumulate in the oil sump 91 until it reaches a level indicated at 92 in Fig. 1, when the oil flows over the wall 92 dividing the oil reservoir 85 from the sump 91.

It is to be understood that the invention is not to be limited to the specific structures, arrangements, and devices hereinabove described, except only insofar as the claims may be so limited, as it will be apparent to those skilled in the art that changes may be made without departing from the principles of the invention. In the construction of the appended claims, I wish it to be understood that a coupling or the like specified in the claims is intended to include either a clutch, either of the friction or free-wheeling type, or a brake; a friction type clutch being a coupling which has both engaging parts movable; an overrunning type clutch being a coupling having one part movable and another part fixed, and rollers or sprags between the parts to permit movement of the movable part in one direction of rotation and cooperating with the parts to prevent movement of the movable part in the other opposite direction; and a brake being a coupling which has one engaging part movable and the other part fixed.

I claim:

1. In a transmission, the combination of a drive shaft, a driven shaft, means for providing a low forward drive power train and a relatively high forward drive power train and a reverse drive power train between said shafts and including a planetary gear set, means for connecting a first element of the gear set with one of said shafts, a clutch for connecting a second element of said gear set with the other of said shafts for conditioning the gear set for said forward drives, a clutch for connecting a third element of said gear set with the other of said shafts for conditioning the gear set for said reverse drive, a first brake comprising a friction band engageable on a drum for a fourth element of said gear set for completing said reverse drive power train between said shafts, a second brake comprising a friction band engageable on a drum for an element of said gear set for completing said relatively high speed forward drive power train between said shafts with said first brake disengaged, said second brake being disengaged when the gear set is conditioned for reverse drive, and a one-way brake for preventing rotation of said fourth element of said gear set for completing said low speed forward drive power train between said shafts and overrunning on an engagement of said second friction brake for completing said relatively high speed forward drive power train the second and third gear set elements being respectively enmeshed with intermeshed elements rotatable on said fourth element, said first gear set element being enmeshed with one of said intermeshed elements.

2. In a transmission, the combination of a drive shaft, a driven shaft, means for providing a forward drive power train and a reverse drive power train between said shafts and including a planetary gear set, means for connecting a first element of said gear set with one of said shafts, a first clutch means for connecting a second element of said gear set with the other of said shafts for conditioning said gear set for forward drive, a second clutch means for connecting a third element of said gear set with the other of the said shafts for conditioning said gear set for reverse drive, a one-way brake for preventing rotation of a fourth element of said gear set in one direction for completing one of said drive power trains between said shafts, and a second brake for said fourth element of said gear set for preventing rotation of said fourth element for completing the other drive power train between said shafts, the second and third gear set elements being respectively enmeshed with intermeshed elements rotatable on said fourth element, and said first gear set element being enmeshed with one of said intermeshed elements.

3. In a transmission, the combination of a drive shaft, a driven shaft, means for providing a forward drive power train and a reverse drive power train between said shafts and including a planetary gear set, means for connecting a first element of said gear set with one of said shafts, a first clutch means for connecting a second element of said gear set with the other of said shafts for conditioning said gear set for forward drive, a second clutch means for connecting a third element of said gear set with the other of said shafts for conditioning said gear set for reverse drive, a one-way brake for preventing rotation of a fourth element in one direction for completing the forward drive power train between said shafts, and a second brake including a friction band engageable on a drum for preventing rotation of said fourth element for completing said reverse drive power train between said shafts, the second and third gear set elements being respectively enmeshed with intermeshed elements rotatable on said fourth element, and said first gear set element being enmeshed with one of said intermeshed elements.

References Cited in the file of this patent

UNITED STATES PATENTS

| | | |
|---|---|---|
| 944,597 | Brush | Dec. 28, 1909 |
| 1,161,724 | Pierce | Nov. 23, 1915 |
| 1,239,213 | Petrelli | Sept. 4, 1917 |
| 1,345,494 | Karl et al. | July 6, 1920 |
| 1,984,235 | Sharpe | Dec. 11, 1934 |
| 2,072,380 | Pfeiffer et al. | Mar. 2, 1937 |
| 2,088,782 | Ford et al. | Aug. 3, 1937 |
| 2,124,192 | Hanson | July 19, 1938 |
| 2,132,728 | Ford | Oct. 11, 1938 |
| 2,150,950 | Thoma | Mar. 21, 1939 |
| 2,174,672 | Soden-Fraunhofen | Oct. 3, 1939 |
| 2,176,138 | Kelley | Oct. 17, 1939 |
| 2,193,213 | Thompson | Mar. 12, 1940 |
| 2,204,872 | Thompson | June 18, 1940 |
| 2,220,174 | Ravigneaux | Nov. 5, 1940 |
| 2,301,072 | Nardone | Nov. 3, 1942 |
| 2,339,269 | James | Jan. 18, 1944 |
| 2,342,105 | Jacobi | Feb. 22, 1944 |
| 2,371,574 | Swennes | Mar. 13, 1945 |
| 2,464,012 | Wallace | Mar. 8, 1949 |
| 2,504,306 | Curtis | Apr. 18, 1950 |
| 2,513,192 | McFarland | June 27, 1950 |
| 2,546,091 | De Normanville | Mar. 20, 1951 |
| 2,576,336 | Farkas | Nov. 27, 1951 |
| 2,578,450 | Pollard | Dec. 11, 1951 |
| 2,605,652 | Kelbel | Aug. 5, 1952 |

FOREIGN PATENTS

| | | |
|---|---|---|
| 9,489 | Great Britain | Dec. 1, 1908 |
| 439,828 | Great Britain | Dec. 16, 1935 |
| 632,292 | Great Britain | Dec. 30, 1945 |
| 48,019 | France | Dec. 3, 1936 |
| | (Addition to No. 809,102) | |
| 915,685 | France | Nov. 14, 1946 |
| 929,571 | France | Dec. 31, 1947 |